United States Patent [19]

Blaisdell et al.

[11] Patent Number: 4,482,942
[45] Date of Patent: Nov. 13, 1984

[54] PROJECTION UNIT INCLUDING GLASS REFLECTOR WITH INSULATIVE CAP MEMBER

[75] Inventors: Ronald G. Blaisdell, Saugus; Harold L. Hough, Beverly; Richard B. Martenson, Lynnfield, all of Mass.

[73] Assignee: GTE Products Corporation, Stamford, Conn.

[21] Appl. No.: 616,797

[22] Filed: Jun. 4, 1984

Related U.S. Application Data

[63] Continuation of Ser. No. 248,168, Mar. 30, 1981, abandoned.

[51] Int. Cl.³ ............................................. F21V 9/00
[52] U.S. Cl. .................................. 362/293; 362/296; 362/347; 362/375; 362/307; 362/350; 362/310; 362/368; 313/113
[58] Field of Search ............... 362/350, 368, 375, 267, 362/296, 306, 310, 347, 365, 293, 307; 353/97; 315/76; 313/112, 113, 315, 317, 318

[56] References Cited

U.S. PATENT DOCUMENTS

| | | |
|---|---|---|
| 3,314,331 | 4/1967 | Wiley . |
| 3,467,822 | 9/1969 | Plume .................................. 362/267 |
| 3,639,750 | 2/1972 | Anthonijsz . |
| 3,789,212 | 1/1974 | Wagner . |
| 4,187,105 | 2/1980 | Wainer et al. ....................... 430/336 |
| 4,213,170 | 7/1980 | Kimball et al. .................. 362/306 X |
| 4,219,870 | 8/1980 | Haraden et al. ................. 362/306 X |
| 4,241,391 | 12/1980 | Pitkjaan et al. .................. 362/306 X |
| 4,254,455 | 3/1981 | Neal, Jr. ........................... 362/804 X |
| 4,320,439 | 3/1982 | Wiley ............................... 362/396 X |
| 4,386,292 | 5/1983 | Rothwell et al. ............... 362/293 X |
| 4,389,700 | 6/1983 | Blaisdell et al. ................ 362/296 X |

FOREIGN PATENT DOCUMENTS 3004849 8/1980 Fed. Rep. of Germany .

*Primary Examiner*—Peter A. Nelson
*Attorney, Agent, or Firm*—Lawrence R. Fraley

[57] ABSTRACT

An improved projection unit including a glass reflector having a forward reflecting portion which includes an internal substantially concave reflecting surface and an apex portion with an opening therein. An incandescent lamp is oriented such that its envelope portion is arranged relative to the reflecting surface of the reflector and its sealed end portion having a pair of spaced apart lead-in wires projecting therefrom is arranged within the reflector's opening. An electrically insulative cap member is fixedly secured to an external surface of a glass reflector immediately adjacent the reflector's rear opening. The cap member includes a pair of contacts spacedly located therein, each of these contacts being joined electrically to a respective one of the projecting lead-in wires from the incandescent lamp. In a further embodiment of the invention, a holder is provided for providing electrical connection between the projection system's circuitry and the incandescent lamp.

28 Claims, 7 Drawing Figures

PROJECTION UNIT INCLUDING GLASS REFLECTOR WITH INSULATIVE CAP MEMBER

This application is a continuation of application Ser. No. 248,168, filed Mar. 30, 1981, now abandoned.

TECHNICAL FIELD

The invention relates to projection units for use in various projection systems such as slide projectors, microfilm viewers, and film projectors.

BACKGROUND

Units of the above variety typically include a compact reflector and incandescent projection lamp (e.g., tungsten-halogen) secured therein. Examples are shown in U.S. Pat. Nos. 3,314,331 (Wiley) and 3,639,750 (Anthonijsz). This assembled component is then positioned within a suitable socket-holder member which in turn is located within (or forms part of) the housing of the desired viewer or projector. An example of such a member is illustrated in U.S. Pat. No. 3,789,212 (Wagner).

Understandably, proper alignment of the component within the socket-holder is essential in order to assure optimum light output for the system. Misalignment of the component within the holder in turn can cause misalignment between this member and the remaining parts of the overall system, including particularly the projector's film gate and lens. The deleterious result is insufficient exposure of the subject item (e.g., microfilm) and a corresponding inadequate illumination on the screen located some distance from the projector.

Another critical parameter for such systems, particularly microfilm viewers, is operating temperature. Typically, incandescent projection lamps operate at relatively high temperatures, making heat dissipation essential. Otherwise, the expected life for such lamps will be drastically curtailed. In addition, an uncomfortably warm lamp and reflector component can render removal thereof (e.g., where repair and/or replacement is necessary) very difficult for the system's operator.

It is believed therefore that a projection unit which substantially eliminates many of the foregoing and related problems and disadvantages of existing such units would constitute a significant advancement in the art.

DISCLOSURE OF THE INVENTION

It is a primary object of the invention to enhance the projection unit art.

It is another object of the invention to provide a projection unit which assures precise alignment between the unit's reflector and lamp component and remaining elements of the system, efficient heat dissipation, and facile removal of this component from its holder even when the component is uncomfortably warm.

It is yet another object of this invention to provide a projection unit possessing the advantageous features described above which can be produced both expeditiously and inexpensively.

In accordance with a primary aspect of the invention, there is provided an improved projection unit including a glass reflector having a forward reflecting portion with an internal, substantially concave reflecting surface therein and an apex portion having an opening therein. The unit further includes an incandescent lamp which includes an envelope portion and a sealed end portion adjacent the envelope, said sealed end having a pair of spaced-apart, lead-in wires projecting therefrom, the lamp located within the reflector such that the envelope is oriented within the reflector's forward reflecting portion and the sealed end is oriented within the rear opening of the reflector's apex portion. The improvement comprises the addition of an electrically insulative cap member which is fixedly secured to an external surface of the glass reflector adjacent the reflector's rear opening. The cap member includes a pair of electrical contacts spacedly located therein, each of theses contacts being electrically connected to a respective one of the lead-in wires which project from the lamp's sealed end portion.

BEST MODE FOR CARRYING OUT THE INVENTION

For a better understanding of the present invention together with other and further objects, advantages and capabilities thereof, reference is made to the following disclosure and appended claims in connection with the above-described drawings.

Figure 1:
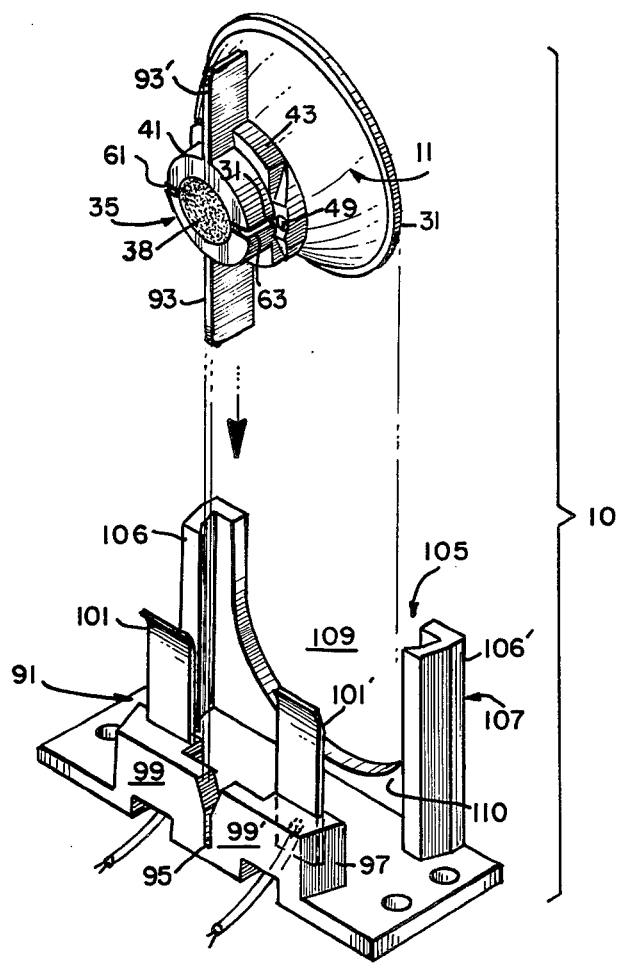
FIG. 1 is an exploded perspective view of a projection unit in accordance with a preferred embodiment of the invention.
Figure 2:
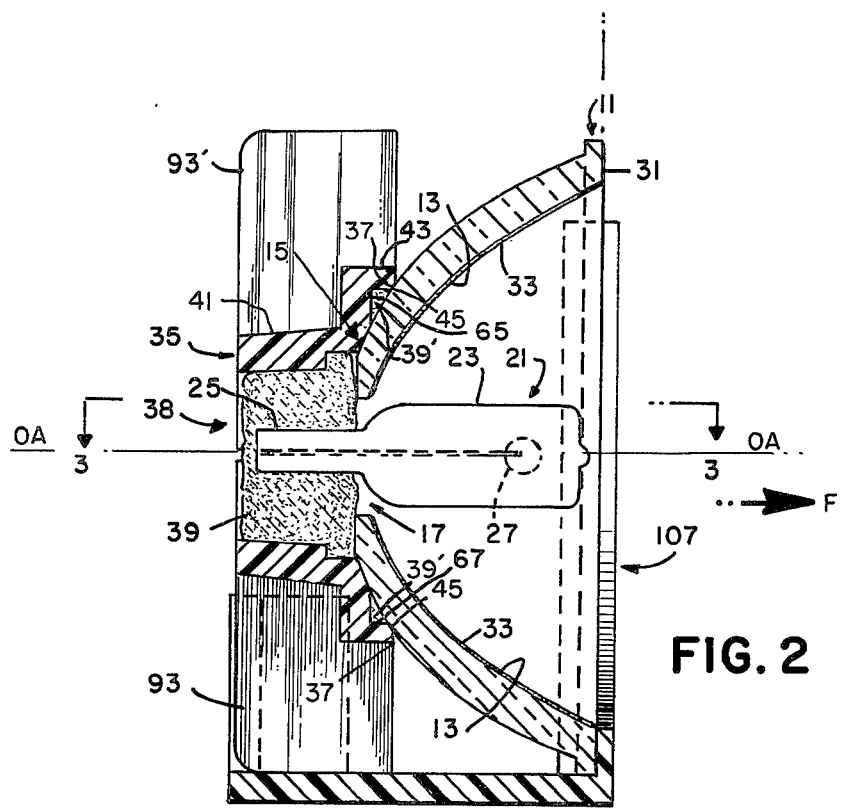
FIG. 2 is a side elevational view, partly in section, of the assembled unit of FIG. 1.
Figure 3:
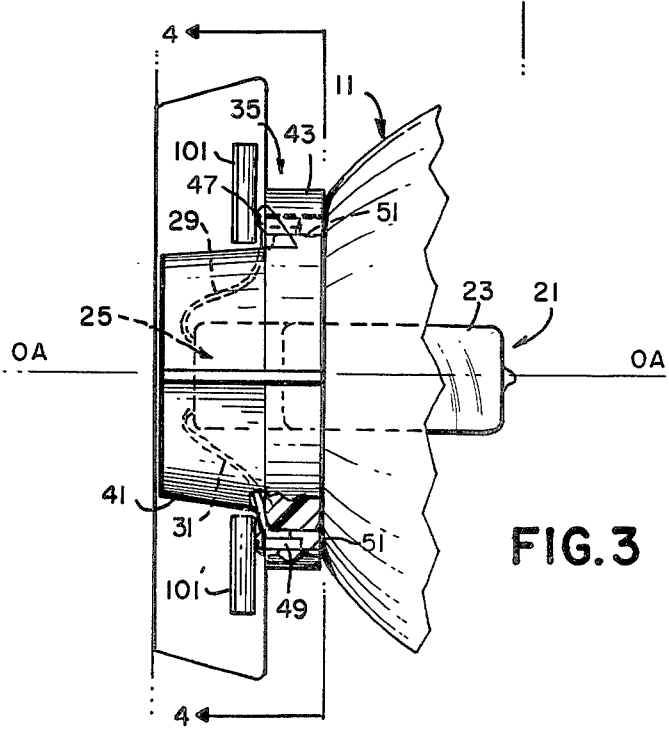
FIG. 3 is a partial top plan view of the invention as taken along the lines 3—3 in FIG. 2.

With particular reference to FIGS. 1-3, there is illustrated an improved projection unit 10 in accordance with a preferred embodiment of the invention. Unit 10 includes a glass reflector 11 having an internal, substantially concave reflecting surface 13 (FIG. 2), and an apex portion 15 including a rear opening 17 therein. Located within the glass reflector is an incandescent lamp 21 which in turn includes an envelope portion 23 and a press sealed end portion 25 located at one end of and therefor adjacent envelope 23. Within envelope portion 23 is located a filament structure 27 (hidden), said structure located on the ends of a pair of lead-in wires 29 and 31 which pass through the sealed end 25 and project therefrom in the manner indicated in FIG. 3.

One example of an incandescent lamp which can be successfully utilized in the invention is sold by the assignee of this invention and often referred to in the industry as a T-2 ¼ wedge-base halogen lamp. Such lamps typically include a tungsten filament structure (27) and a halogen atmosphere within the lamp's envelope portion. Lamps of this variety are referred to also under ANSI code designations ERM, ERN, ERA, ERK, ERB, and ERL. These lamps are otherwise referred to as low wattage lamps, typically operating at a wattage range of from about 6 to 12 watts, an operating potential of from about 6 to 12 volts, and an operational color temperature of approximately 3,000 to 3,400 degree Kelvin. In addition, such lamps have a typical average life of from about 50 to about 200 hours. Low wattage lamps of this type are preferably utilized when unit 10 is to be used in a projection system such as a microfilm viewer. It is understood, however, that the projection unit of the instant invention as described herein is also readily adaptable to utilization in other projection systems, including the aforementioned slide and film projectors (e.g., 16 mm.).

Understandably, orientation of the filament structure of lamp 21 relative to the optical access OA—OA of reflector 11 is critical in order to assure maximum light output in a forward direction F from unit 10. That is, it is essential that structure 27 is precisely aligned in both a vertical manner with regard to the optical axis, as well as a horizontal (depth) manner with regard to the front or rim portion 31 of the reflector to assure optimum output of light reflected by the internal surface 13. In the standard projection system of the type described above, this light is typically centered on a film gate of the system and thereafter passes through a suitable lens before impinging on the desired objective (e.g., a microfilm slide). As will be described below, the instant invention assures precise alignment of structure 27 in both of the aforedescribed directions.

As further illustrated in FIG. 2, lamp 21 is located within unit 10 relative to reflector 11 such that the envelope portion (and therefore the filament structure) is surrounded by the reflecting surface 13, whereas the extending sealed end portion 25 passes through the rear opening 17 of the reflector.

Internal reflecting surface 13 includes a thin layer of a suitable metallic reflective material (e.g., vapor-deposited aluminum) thereon or, in an alternative embodiment, a thin layer of a dichroic coating 33. A dichroic coating is preferred in view of its ability to allow infrared radiation to pass therethrough while reflecting the visible light in the forward direction indicated. Accordingly, glass reflector 11 allows passage (or dissipation) of much of the heat generated by lamp 13 therethrough. In such an arrangement, the use of a heretofore necessary heat filter as an integral part of the projection system is eliminated. Such a heat filter is typically utilized in such systems and is located proximate the film gate. Because such a component serves to attenuate the light output through the film gate, sometimes as much as 20%, its removal is especially desirable. The instant invention is thus able to eliminate the need for this component and therefore provide a significant advantage over many existing systems.

To further assure maximum forward light output from unit 10, the internal configuration (as shown in FIG. 2) for reflecting surface 13 is either substantially ellipsoidal or parabolic.

As stated, precisioned alignment of lamp 21 with respect to the components of the projection system utilizing unit 10 is essential. To provide this alignment, as well as assuring both facile and safe means of unit removal from the corresponding holder member (see below), unit 10 further includes an electrically insulative cap member 35 which is fixedly secured to an external surface 37 of the forward reflecting portion of reflector 11 in a location immediately adjacent the reflector's rear opening 17. With regard to the invention, by the term fixedly secured is meant the form of attachment attainable between a plastic and glass component of the types described herein using a suitable sealing cement. Such a cement is available under the generic name sauereisen. Another cement for use herein is referred to the industry as RTV, sold by the General Electric Company, Cleveland, Ohio. Both of these cements are capable of satisfactorily being used with the invention and thus able to withstand the relatively high temperatures (e.g., approaching 260 degrees celsius) at which unit 10 may operate. Cap member 35 is plastic, and preferably polyphenylene sulfide, a high temperature thermoplastic manufactured and sold by Phillips Chemical Company, Bartsville, Okla., and sold under the trade name Ryton R-10. It is understood that the invention is not limited to the use of a plastic material for cap 35. As an alternate embodiment, this member may be comprised of ceramic material and thus able to withstand working temperatures significantly higher than those mentioned above. For example, use of a ceramic cap in combination with a glass reflector has proven to withstand temperatures approaching 1,000 degrees Celsius. Accordingly, the instant invention is fully capable of using lamps possessing substantially higher wattage ratings than those mentioned above. In one example, unit 10 included a lamp which provided greater than 50 watts.

Insulative cap 35 defines an aperture 38 therein which, in the assembled unit as shown in FIG. 2, is oriented in a coaxial relationship with optical axis OA—OA. In the preferred embodiment, the sealed end 25 of lamp 21 is fixedly secured to the internal surfaces of cap 35 by one of the aforedescribed sealing cements. This cement is illustrated by the numeral 39 in FIG. 2. Accordingly, sealed end 25 extends through opening 17 of reflector 11 and is centrally disposed within the aperture 38 defined by cap 35.

Cap member 35 includes a central, substantially cylindrical shaped main body portion 41 which defines therein the aforedescribed aperture 38. Cylindrical body 41 terminates in an annular flange segment 43 which includes the abutting surface 45 which provides engagement with the external surface 37 of reflector 11. Spacedly positioned within the annular flange portion 43 on opposite sides thereof is a pair of electrical contacts 47 and 49. As shown in FIG. 3, each contact is adapted for being positioned within a corresponding opening 51 (one shown hidden) within flange 43. Each contact 47 and 49 is in the form of an elongated button or pin for being inserted in a frictional manner within the corresponding hole 51, said frictional retention being achieved by the additional insertion of the extreme end portion of a corresponding one of the projecting lead-in wires from lamp 21. That is, each wire is oriented with respect to the corresponding aperture 51 and thereafter pressed into the aperture during contact insertion. This form of securement has proven to be a most reliable means of achieving electrical connection between the metallic contacts and projecting lead-in wires. It must be further added that although in FIG. 3 it is shown to directly connect the lead-in wires to the corresponding contacts within cap 35, it is also within the scope of the invention to use a separate connecting wire to accomplish this coupling. In other words, each projecting lead-in wire 29 and 31 could extend in a substantially linear fashion (parallel to axis OA—OA) from the sealed end 25 and a separate wire employed with this wire welded at one end to the corresponding lead-in wire and at the other to the respective contact member. The arrangement as depicted in the drawings as preferred, however, in view of the material savings as well as elimination of the described welding operations. To facilitate alignment and final insertion of the ends of each projecting wire 29 and 31 within the respective holes 51, a pair of slots 61 and 63 is provided along opposite sides of the cylindrical body 41 of cap 35. Each projecting wire 29 and 31 extends through a respective one of these slots prior to contacting the corresponding electrical contacts. Accordingly, each slot is aligned within the cylindrical portion 41 of cap 35 immediately adjacent a respective one of the contacts 47 or 49 to facilitate the above positioning and final connection.

Figure 4:
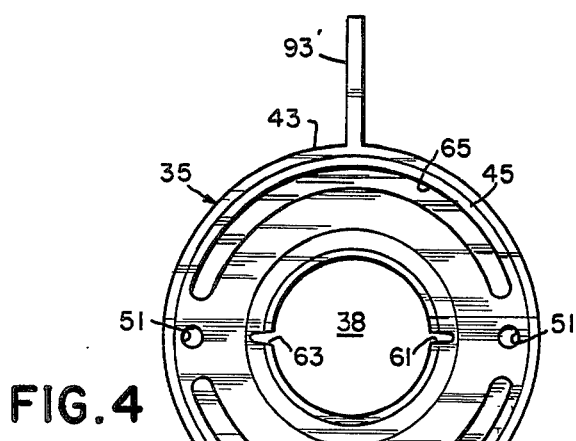
FIG. 4 is a front elevational view of the insulative cap member of the invention as taken along the line 4—4 in FIG. 3, said view excluding (for clarification purposes) several of the components which work in conjunction with the insulative cap.

The aforedescribed fixed securement of the plastic or ceramic cap 35 to the back external surface 37 of glass reflector 11 is achieved using one of the aforementioned sealing cements. As illustrated in detail in FIGS. 2 and 4, this cement (39') is located within a pair of semi-circular grooves 65 and 67 located within the abutting surface 45 of member 35 on upper and lower portions, respectively, of the annular flange 43. Securement of cap 35 to reflector 11 is thus accomplished by positioning a predetermined quantity of the described sealing cement within grooves 65 and 67 and thereafter pressing the abutting surface 45 of cap 35 against the reflector's external surface. It is understood that prior to this securement, lamp 21 has been fixedly secured within the insulative cap 35 in the relationship shown. Accordingly, with the lamp precisely oriented with respect to the forward abutting surfaces of cap 35, it is possible to also assure precisioned orientation of the lamp with respect to the corresponding reflector.

Figure 5:
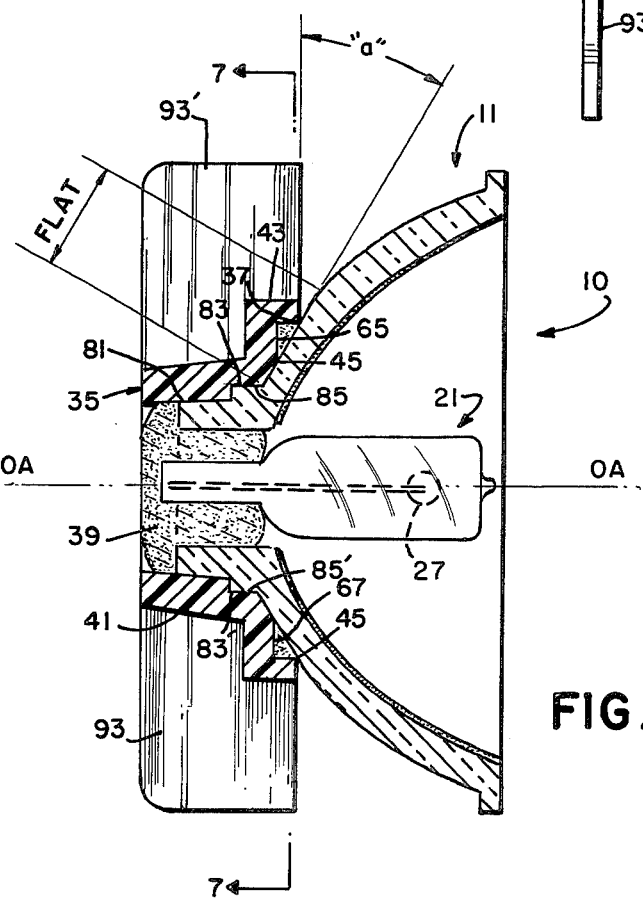
FIG. 5 is a side elevational view, partly in section, of a glass reflector, incandescent lamp, and insulative cap member assembly in accordance with an alternate embodiment of the invention.
Figure 6:
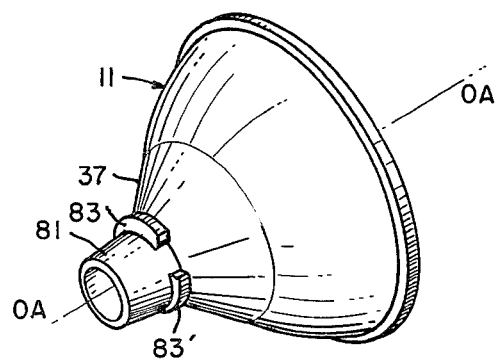
FIG. 6 is a perspective view of the reflector as utilized in the embodiment shown in FIG. 5.
Figure 7:
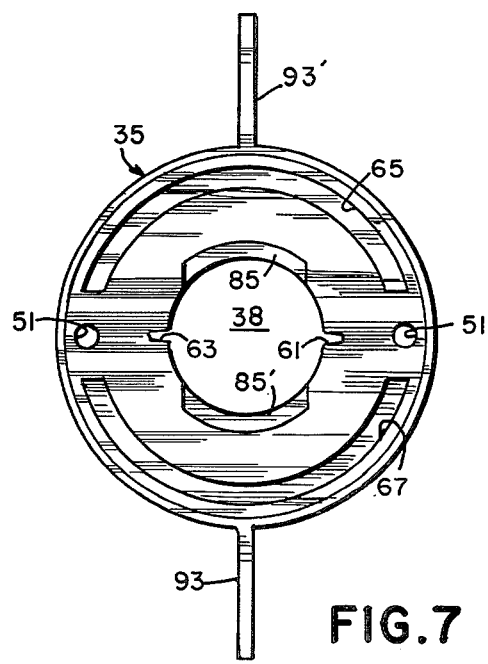
FIG. 7 is a front elevational view of the insulative cap member as used in FIG. 5 as taken along the line 7—7 in FIG. 5, said view excluding (for clarification purposes) many of the components which work in conjunction with the insulative cap member.

With particular reference to FIGS. 5-7, there is illustrated a projection unit in accordance with an alternate embodiment of the invention. The primary difference between this unit and that described above lies in the provision of an extending neck portion 81 of substantially cylindrical configuration from the apex portion of glass reflector 11. Located on upper and lower external surfaces of the neck 81 is a pair of semi-circular protruberance portions 83 and 83', each of which are adapted for being precisely aligned within a corresponding semicircular channel or groove 85 and 85' located within the annular flange 43 of cap 35 (FIG. 7). This mating arrangement between the glass protruberances and corresponding grooves within the insulative cap assures a preestablished rotational orientation between the reflector and cap, should such orientation be desired. In addition, this would also result in a different mode of procedure for assembling unit 10. Specifically, lamp 21 is fixedly secured (e.g., using the described sealing cement 39) with respect to the glass reflector (by being secured within the extending neck portion 81 as shown in FIG. 5) with this assembled component thereafter having the insulative cap attached to the back thereof. The glass protruberances 83 and 83' thus serve to assure proper alignment of the cap member when oriented on the reflector 11. In this arrangement, it is preferred that the external surface 37 against which the abutting surface 45 of flange 43 rests in the final positioning relationship is flat (FIGS. 5 and 6). The corresponding surface on flange 43 is also flat and includes therein the corresponding opposed grooves 65 and 67 for containing the sealing cement therein. This arrangement is preferred to assure a positive abutting engagement and proper alignment between the described surfaces, as well as a corresponding positive securement of the cap member to reflector 11. The flat surface 37, which extends completely about the apex region of reflector 11 (and therefore about optical axis OA—OA) is preferably established at a predetermined angle with respect to the optical axis of reflector 11. This angle is preferably within the range of about 50 to about 70 degrees. As indicated in FIG. 5, the complement of this angle is shown by the letter "a", said angle represented thereby being within the range of 20 to 40 degrees.

Each of the described reflector and cap member assemblies is designed to snugly fit within a corresponding holder 91 (shown in FIG. 1). Understandably, holder 91 is designed to be electrically connected to the electrical circuitry within the desired projection system such that activation of the system will in turn result in activation of unit 10. To assure proper orientation of the reflector and cap within holder 91, the cap member 35 includes at least one thin, elongated fin 93 which extends from the cylindrical body 41 in a downward direction. Fin 93 (as does fin 93' below) preferably forms a part of the cylindrical body portion 41 and is therefore of the same material. As an alternative embodiment, this member can be a separate component fixedly secured (e.g., using one of cements described herein) to the appropriate location on the external surface of body portion 41. Fin 93 is designed to fit snuggly within a corresponding slot 95 located within an upstanding rear portion 97 of holder 91. As shown in FIG. 1, the upstanding rear portion 97 is divided into two segments 99 and 99', each including a corresponding spring contact 101 and 101' respectively. The springlike contacts 101 and 101' are designed to frictionally engage and exert a biasing force against the pin contacts 47 and 49 respectively located within the insulative cap 35 when the cap and reflector are fully positioned within holder 91. The forwardmost part (rim portion 31) of the reflector 11 is adapted for aligning with and being slidably positioned within a corresponding upstanding channel 105 as defined by two projecting post portions 106 and 106' of an upstanding face plate segment 107 of holder 91. Face plate 107 is shown as being spacedly positioned in front of the upstanding rear portion 97 and includes a large aperture 109 which aligns with the corresponding annular opening within the front of reflector 11 to enable light projected from lamp 21 and reflected by reflector 11 to pass therethrough and onto the aforedescribed system components (e.g., film gate). With the reflector and cap fully inserted, each of the springlike contacts 101 and 101' exerts a positive biasing force against the back of the cap member to in turn cause the front edge of the glass reflector to be forced against the inner surface 110 of face plate 107. The results of the aforedescribed positioning is that the cap and reflector (and incandescent lamp) will be frictionally inserted within holder 91 and thus positively retained therein. It is understood that if a more permanent means of retention is desired, a separate clamp or retention clip member (not shown) could be utilized. Such a member could be pivotally oriented on the holder 91 and designed to fit over the uppermost portion of cap 35 and/or reflector 11. As shown also in FIG. 2, the front engaging edge of reflector 11 is substantially planar, as is channel 105 as defined by the upstanding posts of face plate 107. Positioning of the reflector is thus easily accomplished by simply sliding the rim portion 31 down within channel 105 and simultaneously inserting the fin 93 into receiving slot 95.

To provide an effective means of removing the cap and reflector component from holder 91 even while the reflector member is uncomfortably warm, a second thin, elongated fin 93' is provided. Fin 93' extends from the cylindrical body portion 41 of cap 35 in an opposite direction from that of the first aligning fin 93. Accordingly, should one desire to remove the reflector and cap, it is only necessary to grasp this upstanding fin 93' and vertically withdraw the component. Because the fin is thin in configuration and of the material described, it should be relatively cool with respect to the remaining parts of this component and therefore assure facile and safe removal. It is understood with regard to the invention that either of the described fins can serve the function of the other in the final device. Specifically, fin 93' can provide the alignment means for the assembled reflector and cap component while the opposing fin 93 is capable of being grasped by the systems operator should removal be desired.

Holder 91 is preferably of plastic material and even more preferably of the same material as cap 35. Each of the springlike contacts 101 and 101' is comprised of a copper alloy. The remaining materials for use in the invention have been described above.

There has thus been shown and described an improved projection unit which assures precisioned alignment between the unit's reflector and lamp components and the remaining components of the system. The unit is described as capable of assuring efficient heat dissipation (through the glass reflector) to in turn permit relatively high operating temperatures should it be desirable to utilize incandescent lamps having higher wattages than those described above. In addition the invention as described permits safe and facile removal of the reflector and cap members from the corresponding holder member should repair and/or replacement of either the holder or assembled component be desirable. As also described, the invention is capable of being assembled in an expeditious and relatively inexpensive manner in comparison to many projection units available on the market today.

While there have been shown and described what are at present considered the preferred embodiments of the invention, it will be obvious to those skilled in the art that various changes and modifications may be made therein without departing from the scope of the invention as defined by the appended claims.

We claim:

1. A projection unit for being positioned within a holder adapted for being electrically connected to the electrical circuitry associated with a projection system, said projection unit comprising:
   a glass reflector having a forward reflecting portion including an internal, substantially concave reflecting surface and an apex portion having an opening therein;
   an incandescent lamp including an envelope portion having a filament structure therein and a sealed end portion adjacent said envelope portion and including a pair of spaced-apart lead-in wires projection therefrom, said incandescent lamp positioned within said glass reflector such that said envelope portion of said lamp is located substantially within said forward reflecting portion relative to said concave reflecting surface, and said sealed end portion of said lamp is located substantially within said rear opening within said apex portion; and
   a plastic cap member for being positioned within said holder and including an aperture therein, said cap member being fixedly secured to an external surface of said reflecting portion of said glass reflector in an abutting manner immediately adjacent said opening within said apex portion such that said aperture of said plastic cap member is coaxially aligned with the optical axis of said glass reflector to thereby align said plastic cap member in a predetermined manner with said internal substantially concave reflecting surface of said reflector, said sealed end portion of said lamp being centrally disposed within said aperture of said plastic cap member in a fixed manner prior to said fixedly securing of said plastic cap member to said glass reflector and thereby oriented relative to the surfaces of said cap member which abut said glass reflector and also to said internal, substantially concave reflecting surface of said glass reflector so as to be precisely oriented with respect to said reflector, said cap member including a pair of electrical contacts spacedly located therein, each of said electrical contacts electrically connected to a respective one of said lead-in wires projecting from said sealed end portion of said incandescent lamp, said reflecting surface of said glass reflector including a dichroic coating thereon which enables infrared radiation to pass therethrough while reflecting visible light whereby heat from said lamp will pass through said reflecting portion of said reflector.

2. The projection unit according to claim 1 wherein said internal, substantially concave reflecting surface of said glass reflector is substantially ellipsoidal in configuration.

3. The projection unit according to claim 1 wherein said plastic material of said cap member is polyphenylene sulfide.

4. The projection unit according to claim 1 wherein said electrical contacts are spacedly positioned within said cap member on opposite sides thereof, said cap member further including a pair of slots located therein, each of said slots located within a respective one of said opposite sides adjacent a respective one of said electrical contacts, each of said lead-in wires projecting from said sealed end portion of said lamp being connected to said respective one of said contacts through one of said slots.

5. The projection unit according to claim 1 wherein said holder member includes a pair of spaced-apart contacts, each of said contacts electrically engaging a respective one of said contacts located within said cap member when said cap member is positioned within said holder member.

6. The projection unit according to claim 5 wherein said holder member includes an upstanding, substantially planar faceplate portion defining a channel therein and said glass reflector includes a substantially planar forward rim portion, said rim portion being slidably located within said channel when said cap member is positioned within said holder member.

7. The projection unit according to claim 6 wherein each of said contacts within said holder exerts a biasing force against each respective one of said contacts within said cap member when said cap member is positioned within said holder member, said force in turn biasing said rim portion of said glass reflector against said faceplate portion of said holder member.

8. The projection unit according to claim 5 wherein said holder member includes a rear upstanding portion defining a receiving slot therein, said insulative cap member further including means thereon for aligning said cap member within said receiving slot.

9. The projection unit according to claim 8 wherein said aligning means comprises at least one thin, elongated fin, said fin being inserted within said receiving slot when said cap member is positioned within said holder member.

10. The projection unit according to claim 9 wherein the number of said fins is two, each of said fins extending from said cap member on opposing sides thereof.

11. The projection unit according to claim 1 wherein said internal substantially concave reflecting surface of said glass reflector is substantially parabolic in configuration.

12. The projection unit according to claim 1 wherein said plastic cap member includes a pair of semi-circular grooves within the surface thereof which abuts said glass reflector, said fixed securement of said plastic cap member to said glass reflector being accomplished using a quantity of sealing cement located substantially within said grooves.

13. A projection unit for being positioned within a holder adapted for being electrically connected to the electrical circuitry associated with a projection system, said projection unit comprising:

a glass reflector having a forward reflecting portion including an internal, substantially concave reflecting surface and an extending neck portion having an opening therein;

an incandescent lamp including an envelope portion having a filament structure therein and a sealed end portion adjacent said envelope portion and including a pair of spaced-apart lead-in wires projecting therefrom, said incandescent lamp positioned within said glass reflector such that said envelope portion of said lamp is located substantially within said forward reflecting portion relative to said concave reflecting surface, and said sealed end portion of said lamp is located substantially within said opening within said extending neck portion:

a plastic cap member for being positioned within said holder and including an aperture therein, said plastic cap member being fixedly secured to an external surface of said reflecting portion of said glass reflector in an abutting manner immediately adjacent said opening within said extending neck portion such that said aperture of said plastic cap member is coaxially aligned with the optical axis of said glass reflector to thereby align said plastic cap member in a predetermined manner with said internal, substantially concave reflecting surface of said reflector, said sealed end portion of said lamp being centrally disposed within said opening within said extending neck portion of said reflector in a fixed manner prior to said fixedly securing of said plastic cap member to said reflecting portion of said glass reflector such that said lamp will be oriented relative to said external surface of said reflector, said plastic cap member thereby being precisely oriented with respect to both said reflector and said lamp during said fixedly securing of said cap member to said reflector, said cap member including a pair of electrical contacts spacedly located therein, each of said electrical contacts electrically connected to a respective one of said lead-in wires projecting from said sealed end portion of said incandescent lamp, said reflecting surface of said glass reflector including a dichroic coating thereon which enables infrared radiation to pass therethrough while reflecting visible light whereby heat from said lamp will pass through said reflecting portion of said reflector.

14. The projection unit according to claim 13 wherein said external surface of said glass reflector having said insulative cap member secured thereto is substantially flat, said surface oriented at a predetermined angle with respect to said optical axis of said reflector.

15. The projection unit according to claim 14 wherein said predetermined angle is within the range of from about 50 degrees to about 70 degrees.

16. The projection unit according to claim 14 wherein the surface of said plastic cap member which abuts said external surface of said glass reflector is also flat to thereby assure both positive engagement and alignment between said cap and reflector members during said fixed securement.

17. The projection unit according to claim 16 wherein said cap member is secured to said external surface of said glass reflector using a sealing cement, said flat surface of said cap member including a pair of semi-circular grooves located therein, said sealing cement located within said grooves.

18. The projection unit according to claim 13 wherein said extending neck portion of said reflector includes a pair of protuberance portions thereon and said plastic cap member includes a pair of channels therein, each of said protuberance portions being aligned with and located within a respective one of said channels during said fixed securement of said plastic cap member to said reflector.

19. The projection unit according to claim 13 wherein said internal, substantially concave reflecting surface of said glass reflector is substantially ellipsoidal in configuration.

20. The projection unit according to claim 13 wherein said plastic material of said cap member is polyphenylene sulfide.

21. The projection unit according to claim 13 wherein said electrical contacts are spacedly positioned within said cap member on opposite sides thereof, said cap member further including a pair of slots located therein, each of said slots located within a respective one of said opposite sides adjacent a respective one of said electrical contacts, each of said lead-in wires projecting from said sealed end portion of said lamp being connected to said respective one of said contacts through one of said slots.

22. The projection unit according to claim 13 wherein said holder member includes a pair of spaced-apart contacts, each of said contacts electrically engaging a respective one of said contacts located within said cap member when said cap member is positioned within said holder member.

23. The projection unit according to claim 22 wherein said holder member includes an upstanding, substantially planar faceplate portion defining a channel therein and said glass reflector includes a substantially planar forward rim portion, said rim portion being slidably located within said channel when said cap member is positioned within said holder member.

24. The projection unit according to claim 23 wherein each of said contacts within said holder exerts a biasing force against each respective one of said contacts within said cap member when said cap member is positioned within said holder member, said force in turn biasing said rim portion of said glass reflector against said faceplate portion of said holder member.

25. The projection unit according to claim 22 wherein said holder member includes a rear upstanding portion defining a receiving slot therein, said insulative cap member further including means thereon for aligning said cap member within said receiving slot.

26. The projection unit according to claim 25 wherein said aligning means comprises at least one thin, elongated fin, said fin being inserted within said receiving slot when said cap member is positioned within said holder member.

27. The projection unit according to claim 26 wherein the number of said fins is two, each of said fins extending from said cap member on opposing sides thereof.

28. The projection unit according to claim 13 wherein said internal, substantially concave reflecting surface of said glass reflector is substantially parabolic in configuration.

* * * * *